(12) United States Patent
Tong et al.

(10) Patent No.: US 6,956,835 B2
(45) Date of Patent: Oct. 18, 2005

(54) MULTI-CARRIER ARRANGEMENT FOR HIGH SPEED DATA

(75) Inventors: Wen Tong, Ottawa (CA); Leo L. Strawczynski, Ottawa (CA); Shalinl S. Periyalwar, Ottawa (CA); Claude Royer, Hull (CA)

(73) Assignee: Nortel Networks Limited, St. Laurent (CA)

(*) Notice: Subject to any disclaimer, the term of this patent is extended or adjusted under 35 U.S.C. 154(b) by 919 days.

(21) Appl. No.: 09/766,159

(22) Filed: Jan. 19, 2001

(65) Prior Publication Data

US 2001/0038630 A1 Nov. 8, 2001

Related U.S. Application Data

(60) Provisional application No. 60/177,093, filed on Jan. 20, 2000.

(51) Int. Cl.[7] ............................. H04Q 7/00; H04B 7/216
(52) U.S. Cl. ......................................... 370/330; 370/335
(58) Field of Search ................................. 370/252, 330, 370/332, 335–338, 342, 347, 436, 437, 478

(56) References Cited

U.S. PATENT DOCUMENTS

| | | | | |
|---|---|---|---|---|
| 5,726,978 A | * | 3/1998 | Frodigh et al. ............. | 370/252 |
| 6,377,809 B1 | * | 4/2002 | Rezaiifar et al. ............ | 455/455 |
| 6,393,276 B1 | * | 5/2002 | Vanghi ..................... | 455/422.1 |
| 6,542,742 B2 | * | 4/2003 | Schramm et al. ........... | 455/436 |
| 6,754,169 B2 | * | 6/2004 | Baum et al. ................ | 370/204 |

* cited by examiner

Primary Examiner—Chau Nguyen
Assistant Examiner—Andrew Wahba
(74) Attorney, Agent, or Firm—Garlick, Harrison & Markison; Bruce Garlick

(57) ABSTRACT

The system and method of the present invention uses a plurality of carriers by assigning user terminals to the plurality of carriers so that a minimum grade of service is met and so that throughput is maximized. Each serviced user terminal reports the channel quality of each of a plurality of carriers to a servicing base station(s). The reported channel qualities are then converted to maximum supported data rates for each of the user terminals and each of the carriers. These data rates are then used to allocate data service levels and data rates for each of the user terminals so that a minimum grade of service is met for each of the user terminals. Forward link transmissions, e.g., frames/data packets carried on forward channels (F-CHs), are then constructed and transmitted to meet the allocations.

32 Claims, 10 Drawing Sheets

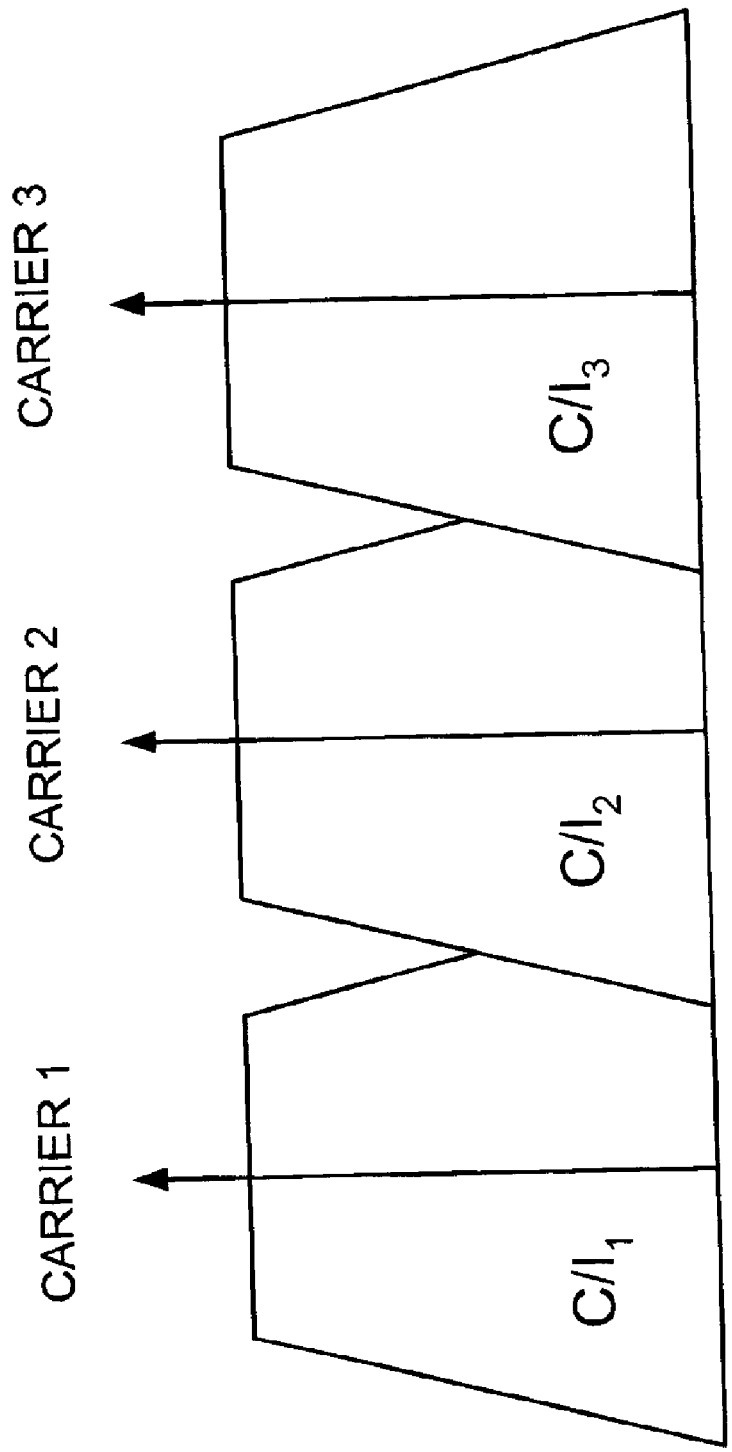

MULTI-CARRIER ARRANGEMENT FOR HIGH SPEED DATA

CROSS-REFERENCE To RELATED APPLICATION

The present application claims priority pursuant to 35 U.S.C. Sec 119(e) to U.S. Provisional Application Ser. No. 60/177,093, filed Jan. 20, 2000, which is hereby incorporated by reference in its entirety.

BACKGROUND

1. Technical Field

The present invention relates generally to cellular wireless communication networks; and more particularly to the transmission of voice communications and data communications in such a cellular wireless communication network.

2. Related Art

Wireless networks are well known. Cellular wireless networks support wireless communication services in many populated areas of the world. Satellite wireless networks are known to support wireless communication services across most surface areas of the Earth. While wireless networks were initially constructed to service voice communications, they are now called upon to support data communications as well.

The demand for data communication services has exploded with the acceptance and widespread use of the Internet. While data communications have historically been serviced via wired connections, wireless users are now demanding that their wireless units also support data communications. Many wireless subscribers now expect to be able to "surf" the Internet, access their email, and perform other data communication activities using their cellular phones, wireless personal data assistants, wirelessly linked notebook computers, and/or other wireless devices. The demand for wireless network data communications will only increase with time. Thus, wireless networks are currently being created/modified to service these burgeoning data communication demands.

Significant performance issues exist when using a wireless network to service data communications. Wireless networks were initially designed to service the well-defined requirements of voice communications. Generally speaking, voice communications require a sustained bandwidth with minimum signal-to-noise ratio (SNR) and continuity requirements. Data communications, on the other hand, have very different performance requirements. Data communications are typically bursty, discontinuous, and may require a relatively high bandwidth during their active portions. To understand the difficulties in servicing data communications within a wireless network, consider the structure and operation of a cellular wireless network.

Cellular wireless networks include a "network infrastructure" that wirelessly communicates with user terminals within a respective service coverage area. The network infrastructure typically includes a plurality of base stations dispersed throughout the service coverage area, each of which supports wireless communications within a respective cell (or set of sectors). The base stations couple to base station controllers (BSCs), with each BSC serving a plurality of base stations. Each BSC couples to a mobile switching center (MSC). Each BSC also typically directly or indirectly couples to the Internet.

In operation, a user terminal communicates with one (or more) of the base stations. A BSC coupled to the serving base station routes voice communications between the MSC and the serving base station. The MSC routes the voice communication to another MSC or to the public switched telephone network (PSTN). BSCs route data communications between a servicing base station and a packet data network that may couple to the Internet.

The wireless link between the base station and the user terminal is defined by one of a plurality of operating standards, e.g., AMPS, TDMA, CDMA, GSM, etc. These operating standards, as well as new 3G and 4G operating standards define the manner in which the wireless link may be allocated, setup, serviced and torn down. These operating standards must set forth operations that will be satisfactory in servicing both voice and data communications.

The wireless network infrastructure must support both low bit rate voice communications and the higher bit rate data communications. More particularly, the network infrastructure must transmit low bit rate, delay sensitive voice communications together with high data rate, delay tolerant rate data communications. While voice communications typically have a long hold time, e.g., remain active for longer than two minutes on the average, high data rate/delay tolerant data communications are bursty and are active only sporadically. As contrasted to the channel allocation requirements of voice communications, channels must be frequently allocated and deallocated to the data communication in order to avoid wasting spectrum. Such allocation and deallocation of channels to the data communications consumes significant overhead.

To increase throughput of conventional cellular wireless networks, the allocated frequency spectrum is oftentimes subdivided into a plurality of sub-spectrums, each of which is serviced by a respective carrier. With such a subdivision, the number of user terminals that may be serviced increases relative to the number that may be serviced by a single carrier. Further, multicarrier systems are less sensitive to dispersion and frequency selective fading. Thus, gains are achieved in systems of this type by servicing a greater number of user terminals at any given time. Further, the overhead consumed in allocating/deallocating channels significantly may also decrease in a system of this type since a greater number of user terminals may be serviced at any one time. However, the bandwidth available for communications on each carrier is less than it would be for a single carrier using the full spectrum. Thus, the gains achieved in reducing allocation/deallocation overhead are offset by reduced throughput.

It would therefore be desirable to provide a communication system that efficiently uses a plurality of carriers to service communications with minimal waste of spectral capacity. Further, it would also be desirable to provide a communication system that services both delay sensitive low bit rate voice communications and delay tolerant data communications upon a plurality of carriers without requiring significant additional overhead resources.

SUMMARY OF THE INVENTION

The system and method of the present invention efficiently uses a plurality of carriers by assigning user terminals to the plurality of carriers so that a minimum grade of service is met and so that throughput is maximized. To accomplish these goals, each serviced user terminal reports the channel quality of each of the plurality of carriers to a servicing base station(s). The reported channel qualities may then be converted to maximum supported data rates for each of the user terminals and each of the carriers. These data rates are then used to allocate data service levels and data rates for each of the user terminals so that a minimum grade of service is met for each of the user terminals. Forward link transmissions, e.g., frames/data packets carried on forward channels (F-CHs), are then constructed and transmitted to meet the allocations. With assignments made in this fashion, throughput across the multiple carriers is maximized.

According to one aspect of the present invention, each carrier supports a different maximum data rate per user at any given time and includes a scheduler that assigns a data rate allocation for each carrier based on criteria. The criteria of optimizing total throughput is achieved by minimizing the number of frames being used to satisfy the transmission needs of all the users. In this fashion, minimum service levels are met and throughput is maximized.

In one embodiment of the present invention, a Time Division Multiplexed (TDM) superframe/frame structure is employed to carry data and voice communications on the F-CHs. This superframe/frame structure is optimized for servicing both delay tolerant, high data rate data transmissions, and delay intolerant, fixed rate voice transmissions. The TDM frame structure of the present invention supports flexible framing of transmissions that include both the lower data rate, delay intolerant voice communications as well as the delay tolerant higher data rate data communications using sub-framing operations. Thus, the system and method of the present invention provides significant benefits for both data communication only wireless traffic and for a combination of voice communication and data communication wireless traffic. This TDM frame structure may include a self-indication of its contents such that user terminals may determine whether the TDM frame carries its voice or data communications via a simple inspection of the TDM frame itself. With this structure, any overhead that was previously required to allocate/deallocate channels is no longer consumed.

The TDM frame structure of the present invention employs data rate matching so that different data rates may be supported for different user terminals sharing the TDM frame structure. When used on the forward link, a base station selects data rates for each of a plurality of serviced user terminals based upon the channel qualities of the F-CHs reported by the user terminals for the plurality of carriers. Then, the base station/network infrastructure constructs a plurality of superframes to service required voice and data communications on the plurality of F-CHs for a given time period such that sufficient service levels are met.

Other features and advantages of the present invention will become apparent from the following detailed description of the invention made with reference to the accompanying drawings.

BRIEF DESCRIPTION OF THE DRAWINGS

A better understanding of the present invention can be obtained when the following detailed description of the preferred embodiment is considered in conjunction with the following drawings, in which:

FIG. 1B is a block diagram illustrating the structure of adjacent carriers upon which high speed data frames are modulated according to the present invention;

DETAILED DESCRIPTION OF THE DRAWINGS

Figure 1A:
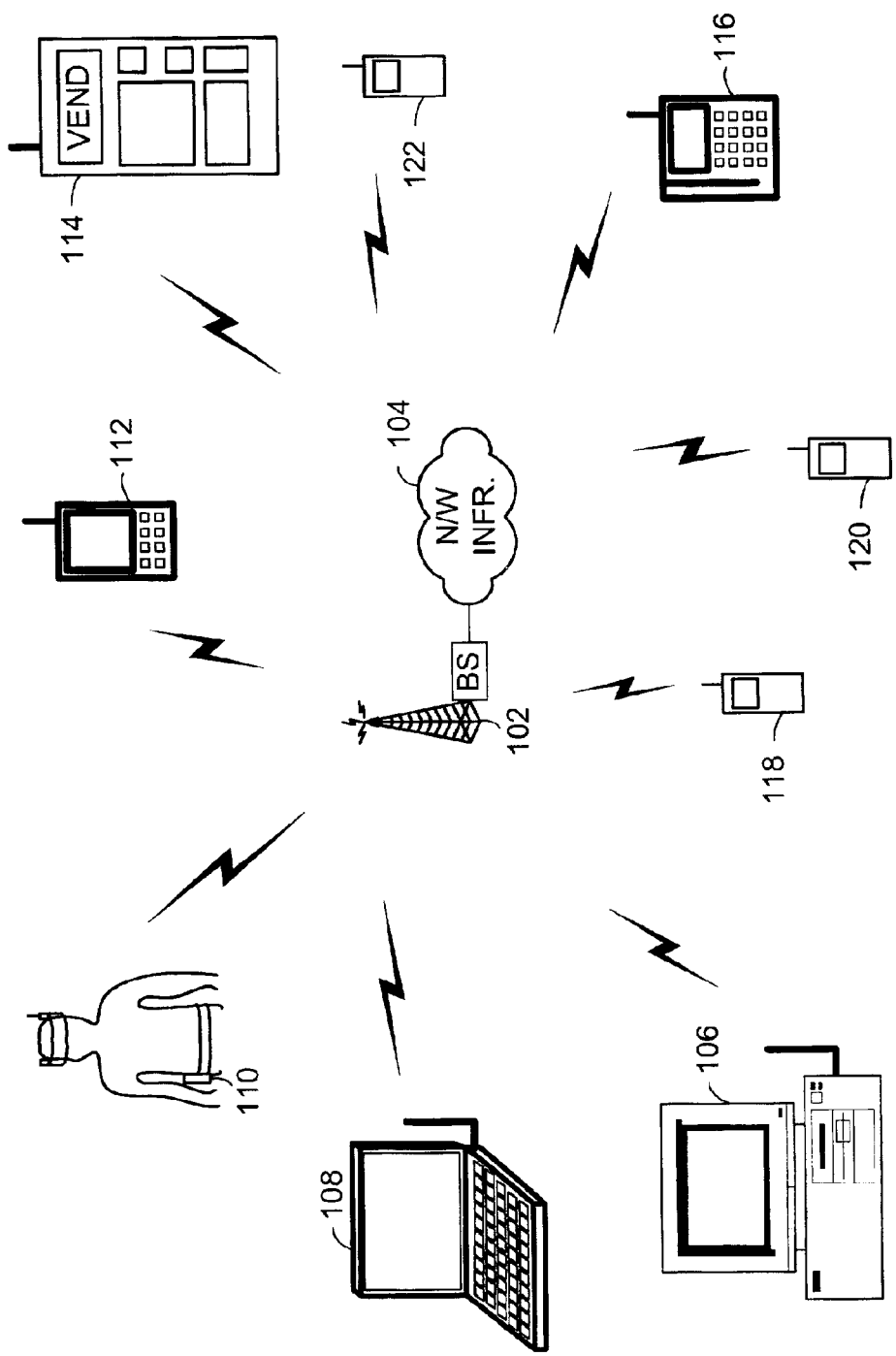
FIG. 1A is a system diagram illustrating a portion of a cellular wireless network constructed according to the present invention.

FIG. 1A is a system diagram illustrating a portion of a cellular system 100 in which a base station 102 services a plurality of user terminals 106–122 on a plurality of carriers corresponding to a plurality of forward channels (F-CHs) according to the present invention. The cellular system 100 infrastructure shown includes a base station 102 and a network infrastructure 104. These components are generally known and will be described only as they relate to the teachings of the present invention. The cellular system 100 operates according to a CDMA standard that has been modified according to the present invention, e.g., IS-95B, IS-2000, 3GPP, W-CDMA, or another CDMA standard that has been modified according to the operations described herein. In particular, the high speed data (HSD) 1×EV standard data only (DO), the HSD 1×EV standard data and voice (DV), and the 3GPP HSD standard may operate according to some of the aspects of the present invention.

The base station 102 provides wireless service within a corresponding geographic area (e.g., cell or sector(s)) on the plurality of carriers. The base station 102 establishes a plurality of forward links and at least one reverse link with the user terminals 106–122. Once these links are established, the base station 102 transmits voice communications and data communications to the user terminals 106–122 on the plurality of F-CHs. Likewise, the user terminals 106–122 transmit voice communications and data communications to the base station 102 on the reverse link(s).

Some of the user terminals (e.g., voice terminals 118, 120 and 122) service only voice communications. Alternatively, other of the user terminals (e.g., data terminal 112, vending machine 114 and credit card terminal 116) service only data communications. Further, at least some of these users terminals (e.g., desktop computer 106, laptop computer 108, and wearable computer 110) service both voice communications and data communications.

Each of the F-CHs is carried upon a respective carrier, e.g., Carrier 1, Carrier 2, Carrier 3, etc. In an embodiment that will be described herein, the carriers are adjacent to one another in frequency. However, adjacency of the carriers is not a requirement of the present invention. Each of these F-CHs is shared by a plurality of user terminals in a Time Domain Multiplexed (TDM) fashion. The base station 102 may service the F-CHs in each of a plurality of sectors, with each sector servicing a subset of the user terminals 106–122.

To accomplish sharing of the F-CHs, each F-CH may use a TDM superframe structure that includes a plurality of frames. This superframe/frame structure flexibly accommodates both voice communications and data communications, without adversely impacting the requirements of the voice communications. Further, this superframe/frame structure efficiently supports data communications without wasting any valuable allocated bandwidth and by fairly allocating the available allocated bandwidth among the serviced user terminals. This TDM frame structure may also include one or more indications of its contents that are employed by the user terminals to determine whether the TDM frame structure includes voice/data for the user terminal and, if so, at what locations in the TDM frame the voice/data is located and, optionally, at what data rate the voice/data is sent. The user terminal may then receive the voice/data based upon this indication.

FIG. 1B is a block diagram illustrating the structure of adjacent carriers that service F-CHs upon which high speed data frames are modulated according to the present invention. The structure of FIG. 1B includes parallel channels that deliver separate data flows simultaneously using the superframe/frame structure of the present invention. Three such carriers of the multi-carrier are shown, namely, Carrier-1, Carrier-2, and Carrier-3. A characteristic of the multi-carrier is the transmission of data flows on multiple, separately modulated carriers. Each carrier has different channel conditions in that the channel quality, e.g., C/I, for a given subscriber is not the same for each carrier. Independent/correlated fading arises in each carrier during throughput of data flows on the carriers. In other words, each carrier can support a maximum data rate per user that is not the same for each.

For these reasons, it is desirable to service user terminals on carriers that are favorable for the user terminal. Further, it is desirable to manage the operation of each carrier to optimize the operation of the cell/sector serviced by the carriers. For example, it may be advantageous in some operations to place all voice communications on one of the carriers, e.g., Carrier-1, and to place data communications on the other carriers, e.g., Carrier-2 and Carrier-3. Further, with these operations, not all of the carriers may be needed at any given time. To avoid adjacent band interference, it may be desirable to temporarily discontinue transmissions on one of the carriers, e.g., Carrier-2, when it is not required during low loading periods.

Figure 2:
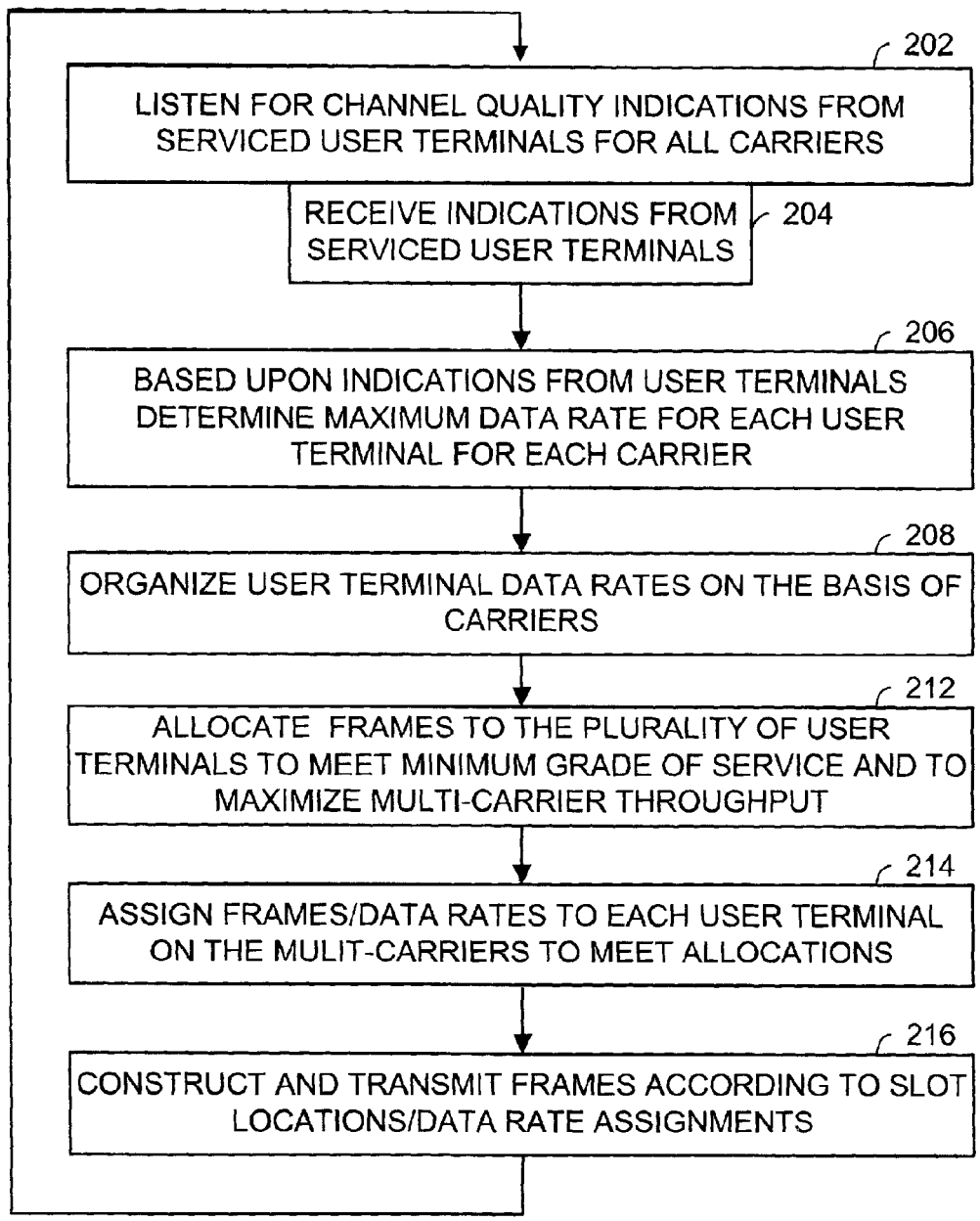
FIG. 2 is a logic diagram illustrating operation according to the present invention in allocating voice communications and data communications to a plurality of carriers.

FIG. 2 is a logic diagram illustrating operation according to the present invention in allocating voice communications and data communications to a plurality of carriers. The base station/infrastructure listens for channel quality indications/data rate indications from a plurality of serviced user terminals (step 202). A plurality of user terminals serviced by a wireless network receives pilot signals from one or more base stations. In most implementations, a pilot signal will be transmitted from each sector of each base station and received by a plurality of terminals within transmission range. However, in other implementations, at least one base station sector includes a plurality of beams, each of which includes a transmitted pilot signal. Based upon measured strengths of received pilot signals, measured interference, and thresholds stored internal to the user terminal, each user terminal reports the C/I ratio(s) for the pilot signals to a base station servicing its reverse link (step 204). Alternately, the user terminals may calculate a maximum data rate at which they could receive data on each of the carriers and report this maximum data rate as the channel quality indication. The base station receives channel quality indications from most, if not all of its serviced user terminals. Once the period of time expires, operation will proceed from step 204.

With the channel quality indications received from the plurality of user terminals, the base station/network infrastructure determines a data rate that may be supported for each reporting user terminal on each serviced carrier (step 206) for those terminals that reported a C/I for the carrier. Next, the base station/next infrastructure organizes the user terminal maximum data rates according to carrier (step 208). Based upon the data rates for the user terminals and the carriers, and additional information regarding required minimum grades of service for the plurality of user terminals, the base station/network infrastructure allocates frames to maximize multi-carrier throughput (step 212).

For example, each of the user terminals may have a request to receive a minimum bit rate that is to be met in each superframe. Alternately, each of the user terminals may be guaranteed a certain rate over time. In allocating packets/frames to the plurality of user terminals, the base station/network infrastructure meets the minimum grade of service required for each user terminal and also maximizes the multi-carrier throughput. Further, in this allocation, any packets/frames that are not required to meet the minimum grade of service for each user terminal are also allocated to the user terminals. These allocations may be based upon respective grades of service, fairness, or another criteria.

Then, based upon the packet/frame allocations, the base station/network infrastructure assigns frame locations and data rates on the plurality of carriers to the user terminals (step 214). Finally, the base station constructs and transmits frames on the plurality of carriers according to the frame location/data rate assignments. The process is then repeated.

In one embodiment of a priority system for assigning packets/frames, certain higher priority users may be assigned more than one available frame for every one frame assigned to other lower priority users. This concept can be generalized. Classes of service can be defined for the services supported. A user or terminal could support several (logical) connections with a different service and service class for each connection. For example, service classes 1, 2, and 3 could have frames allocated in the ratio of 1:n2:n3. With this allocation, on the average, for every frame assigned to a user in service class 1, n2 frames are assigned to a user in service class 2 and n3 frames are assigned to a user in service class 3.

The scheduling algorithm is intended to maximize aggregate throughput based on the different data rates that the carriers can handle per user and based on the different classes of service, latency requirements and different data rates that the users require. In this manner, the scheduler (further described with reference to FIG. 7) decides which user is to receive information in a frame for a particular carrier by optimizing the order in which carriers are selected to carry communications to the user terminals. The communications to a particular user terminal can be in any frame on any carrier.

For instance, if only a single user needs to transfer data, then the user may use a frame from each of the carriers. Such was not possible in conventional TDM structure, in which each user would have to keep using the frames for the same carrier. Thus, as compared with conventional TDM structures that confine users to frames of a single carrier, the maximum data rate in accordance with the present invention would increase by a factor of N per user, where N represents the total number of carriers available.

The assignment of the frames to carriers is based on a calculation of the aggregate throughput for all users. The goal is to maximize the aggregate throughput. This will minimize the total number of frames that need to be used by the users overall to effect their simultaneous transmission. The scheduler gives users the ability to share any of the frames in the channels as would result in better optimization of the overall throughput subject to constraints due to class of service priority and latency requirements. That is, to attain the best throughput through the channels, the number of frames being used to satisfy the needs of all the users should be minimized.

The selection of the carrier and the data rate is in accordance with joint scheduling criteria, whether it be in accordance with fairness criteria to give all users the same access or on priority criteria to give certain users more access and maintain certain latency requirements. In both cases, a percentage of frames is allocated for each user. The percentage assigned per user may vary dynamically in response to channel conditions and latency constraints.

One example of a scheduling algorithm that maximizes the total throughput of all users among all carriers includes a case for a 3-carrier and N-terminal arrangement. Each terminal reports the measured C/I for each carrier. The following matrix of Equation (1) results from mapping the C/I to the data rate R (where the superscript identifies the user and the subscript identifies the carrier):

$$\begin{matrix} C/I_1^1 C/I_1^2 \ldots C/I_1^N \\ C/I_2^1 C/I_2^2 \ldots C/I_2^N \\ C/I_3^1 C/I_3^2 \ldots C/I_3^N \end{matrix} \longrightarrow \begin{matrix} R_1^1 R_1^2 \ldots R_1^N \\ R_2^1 R_2^2 \ldots R_2^N \\ R_3^1 R_3^2 \ldots R_3^N \end{matrix}$$

For a specific frame interval the scheduler assigns the 3 frames available to terminals i, j, k from the N terminals in the system based on certain criteria. The following aggregate rates are calculated:

Rate (i, j, k)=$R_1^i + R_2^j + R_3^k$

Rate (i, k, j)=$R_1^i + R_2^k + R_3^{ij}$

Rate (j, i, k)=$R_1^j + R_2^i + R_3^k$

Rate (j, k, i)=$R_1^j + R_2^k + R_3^i$

Rate (k, i, j)=$R_1^k + R_2^i + R_3^{ij}$

Rate (k, j, i)=$R_1^k + R_2^j + R_3^i$

Where Rate (l, m, n) is the aggregate data rate when user terminals l, m, and n are assigned to carriers 1, 2, and 3, respectively. The rates are then compared and the maximum aggregate rate R(imax, jmax, kmax)=$R_1^{imax} + R_2^{jmax} + R_3^{kmax}$ is obtained. The scheduler assigns the terminals imax, jmax and kmax to the carriers 1, 2 and 3 respectively. Data is transmitted to the terminals imax, jmax and kmax at rate $R_1^{imax}$ on carrier 1, $R_2^{jmax}$ on carrier 2 and $R_3^{kmax}$ on carrier 3 respectively. The scheduler maximizes the aggregate data rate for a specific frame interval. Note that this scheduling is still applicable if multiple frames are assigned to one terminal for a specific frame interval.

Figure 3:
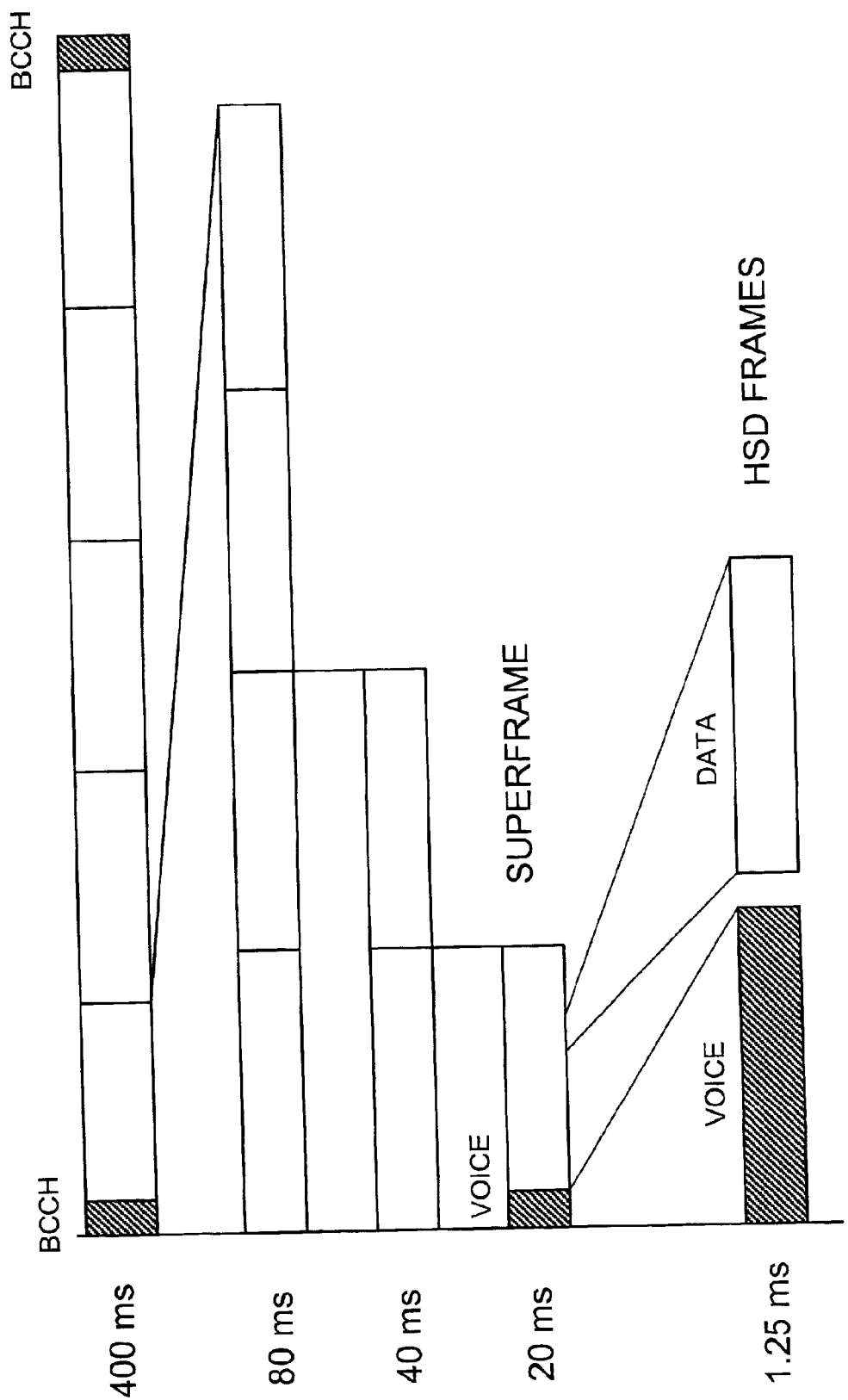
FIG. 3 is a block diagram illustrating the structure of superframes and high speed data frames according to the present invention.

FIG. 3 is a block diagram illustrating the structure of superframes and high speed data (HSD) frames according to the present invention that are transmitted on the plurality of carriers. The superframe structure is transmitted on each of the F-CHs and fits within the other requirements placed upon the forward links produced by the base station 102. In particular, every 400 ms, the base station 102 transmits a broadcast channel (BCCH) field. In one embodiment, the BCCH field is only included on one of the F-CHs. However, in another embodiment, the BCCH field is included on each of the F-CHs. In either case, an integer multiple of the superframes fits within the timing requirement of the BCCH. As described herein, each superframe is 20 ms in length and includes 16 HSD frames, each having a duration of 1.25 ms. With this structure, the BCCH field is transmitted every 400 ms using 8 HSD frames at a data rate of 76.8 kbps. Further, every 20th 20 ms superframe will include the BCCH field. Each 20 ms superframe may include voice communications and/or data communications.

The superframe structure is shared among a plurality of users serviced on the corresponding F-CH. In some operations, all voice and data communications for a single user terminal are carried on a single one of the F-CHs. However, in other operations, two or more of the F-CHs carry voice and/or data communications for a single user terminal. In this superframe structure, each superframe includes an integer number of frames. Each of the frames may carry voice communications, data communications, or a combination of voice communications and data communications organized as packets as described below. The data rate is variable on a packet-by-packet basis with the data rate chosen for the packet determined based upon the user terminal(s) being serviced in such packet and respective channel quality indications for the user terminal(s), as reported by the user terminal(s). Thus, each superframe typically services a plurality of user terminals at a plurality of differing data rates. Further, each superframe is typically filled with voice and/or data so that all available spectrum is used.

In a described embodiment of the present invention, the F-CH is a spread-spectrum code division multiplexed channel. The F-CH services only a single user terminal at any given time. As described below, voice and data users may be time division multiplexed on HSD frames. To increase channel throughput, the forward link transmission being serviced at any given time is modulated with a set of 16 Walsh codes prior to its transmission. Thus, the F-CH typically uses no code sharing to distinguish user terminals in the embodiment and only a single user terminal is serviced on any of the F-CHs at any given instant of time. However, in other embodiments, Walsh code subsets, e.g., 8 Walsh codes, 4 Walsh codes, etc., may be used to distinguish user terminals from one another so that more than one user terminal is serviced on any of the F-CHs at any given instant of time.

Portions of the frames of the superframe may contain data that is separately modulated with different Walsh codes so that the particular portion of the superframe/frame is separately received by each serviced user terminal. An example of such data is power control data, e.g., power control bits, that are transmitted on the F-CH but are employed to control the transmit power of reverse link transmissions. A plurality of power control bits that are intended for a plurality of different user terminals are separately modulated with a plurality of corresponding Walsh codes and transmitted on the F-CH within the superframe/frame the same time. The user terminals then decode this segment of the superframe/frame to receive their individual power control bits.

Because the data throughput requirements placed on the reverse link are substantially less than those placed on the forward link, the reverse links are serviced using conventional reverse link CDMA techniques. According to the present invention, the user terminals report F-CHs channel qualities, e.g., pilot signal strength/interference ratio, or maximum supportable data rate. Based upon the F-CHs channel qualities reported by each user terminal, as well as additional factors, the base station allocates frames of the F-CHs to the user terminals on the plurality of available carriers.

The size of each superframe is limited by the delay tolerance for the low latency service (voice communications). Based on the delay tolerance (e.g., 20 ms), an integer number of frames are included to form a superframe of that same duration. In each superframe, each voice customer is allocated only the frames or portions of frames needed to deliver the voice communication. Data communications are assigned to the remaining frames and portions of frames that are not used to carry the voice communication. Preferably, the voice calls are clustered at the beginning of the superframe.

Figure 4:
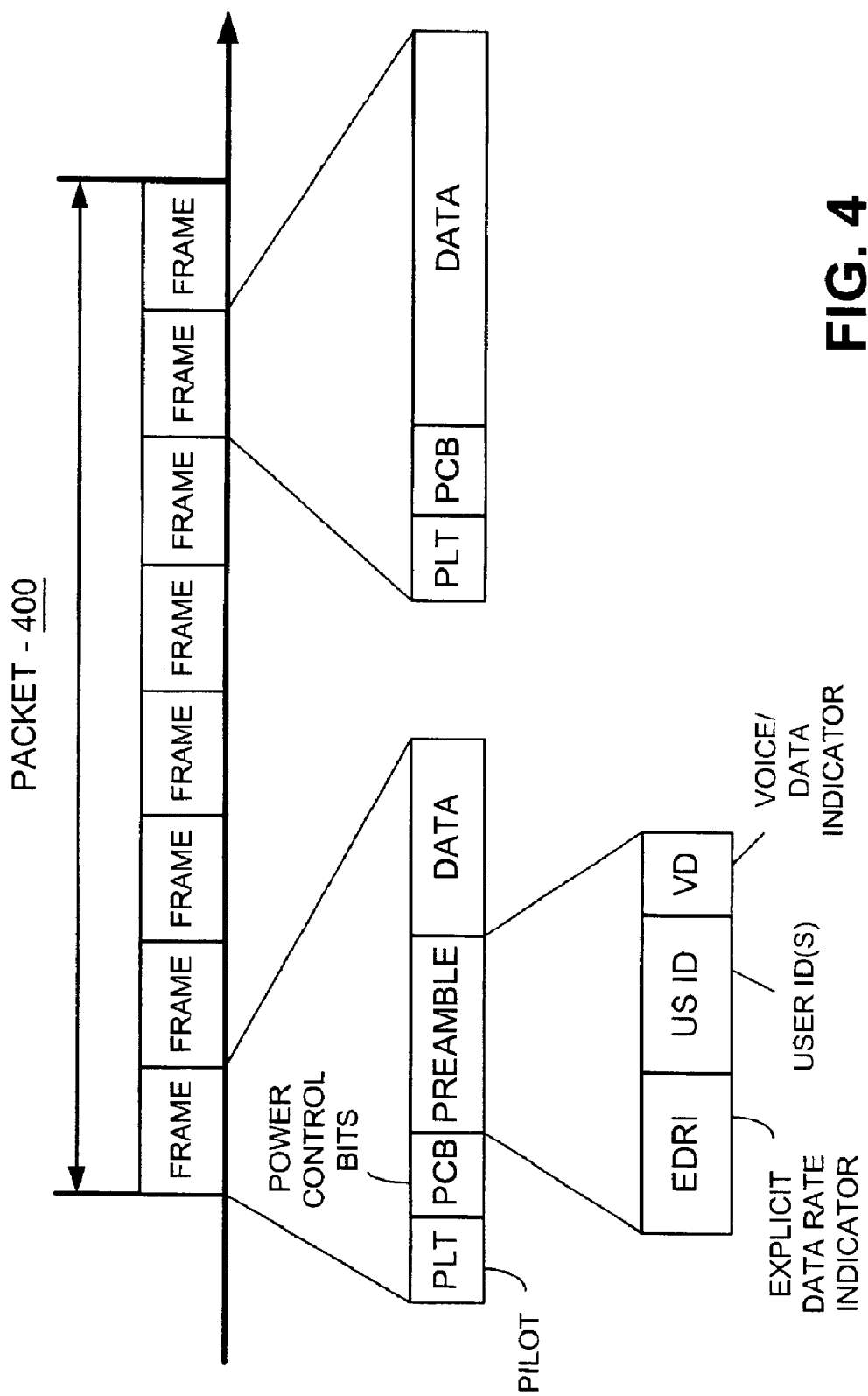
FIG. 4 is a block diagram illustrating the structure of a packet according to the present invention that is transmitted on a carrier.

FIG. 4 is a block diagram illustrating the structure of a packet 400 according to the present invention that carries voice or data. In a simple embodiment of the packet 400, the packet includes one or more HSD frames that are successively transmitted on a F-CH. Each HSD frame is 1.25 ms in duration and includes 1536 chips and 8 sub-frames. Each subframe includes 192 chips. Each HSD frame includes a pilot signal and power control bits at the beginning of the HSD frame. The first frame of the packet 400 includes a preamble following the pilot signal and power control bits at the beginning of the HSD frame.

Generally speaking, the packet 400 includes a sequential group of frames, e.g., HSD frames that are transmitted on a single carrier. The preamble of the packet 400 indicates the contents of the packet 400. Such indication may include an explicit data rate indication, whether the packet 400 includes voice or data, and for which user terminal(s) the packet is intended.

The pilot signal is used both for timing purposes and for channel quality estimation. The pilot signal is contained at the beginning of each HSD frame 400 and pilot signals among all base stations within a service area synchronized. User terminals receive the pilot signals and, based upon the strength of the pilot signals received, and the corresponding interference levels, determine a channel quality indication. Each user terminal then reports to a base station serving a plurality of channel quality indications, one each for each carrier. These channel quality indication reports, e.g., Pilot Strength Measurement Message, are reported to its serving base station on either a R-TCH or a reverse access/control channel One indication of channel quality is the carrier-to-interference (C/I) ratio for a respective pilot signal/channel. Thus, in one operation according to the present invention, the user terminal reports C/I ratios for each pilot signal it measures. Such measuring is done for each of the carriers. Such reporting may be limited based upon thresholds applied by the user terminal. In an alternate operation, a user terminal would, instead of reporting the channel quality relating to each received pilot signal, determine a maximum supportable data rate for each corresponding channel and report the maximum supportable data rate(s) to its serving base station. The base station/network infrastructure then uses the reported channel qualities to determine from which base station(s) to transmit forward link voice communications and/or data communications to the user terminal and at what maximum data rate.

Each HSD frame also includes power control bits (PCBs) that direct user terminals currently serviced by the F-CH to either increase or decrease their reverse link transmission power. In the described embodiment, each HSD frame includes a PCB for each user terminal serviced by the F-CH. In this embodiment, the PCBs are punctured on the I & Q branches of the F-CH separately. For each user, a respective power control bit is modulated by one of 16 Walsh codes. These Walsh encoded outputs are then further modulated by a two times PN spreading code. Thus, with this modulation type, a maximum of 16 users may be served on the I-branch and a maximum of 16 users may be served on the Q-branch so that the reverse link power control of a total of 32 users per frame and per carrier may be controlled via the PCB bits.

The preamble includes an explicit data rate indicator (EDRI), a user identification field, and a voice/data indicator. The EDRI provides an explicit indication of the data rate for data contained in the packet 400. The user identification field identifies user terminal(s) for whom the data contained in the packet is intended. The voice/data indicator indicates whether the packet contains data or voice, and may indicate the relative position(s) of the voice/data within the packet 400. The preamble provides information for all of the frames that make up the packet. The basic preamble information may be repeated a number of times, the number of repetitions of the preamble being a function of the data rate.

Figure 5:
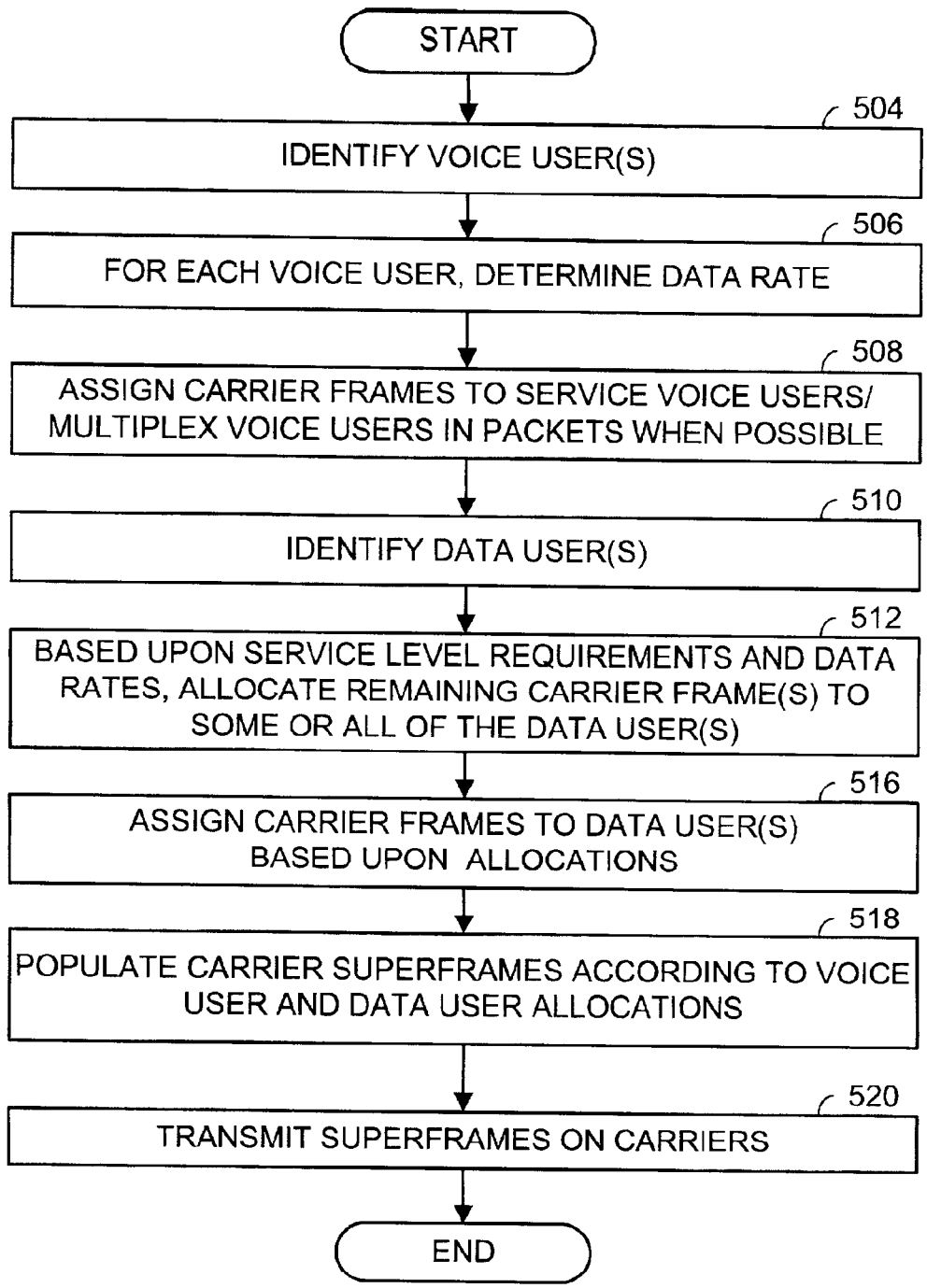
FIG. 5 is a logic diagram illustrating operation according to the present invention in constructing a plurality of superframes, each of which will be carried upon a separate carrier during a common time interval.

FIG. 5 is a logic diagram illustrating operation according to the present invention in constructing a plurality of superframes, each of which will be carried upon a separate F-CH during a common time interval. As was previously discussed, the superframe has a maximum duration to meet the requirements of the voice calls. Further, the superframe includes a plurality of frames. The frames have durations and framing structures appropriate to service the particular data rates, and data throughput requirements of the system.

Operation commences with identifying each voice user that is to be serviced by the superframes (step 504). As was described with reference to FIG. 1A, each superframe may service zero, one or more voice user terminals 118, 120, and 122. Thus, voice communication information for each serviced user terminal, if required, must be included in one (or more) of the superframes being constructed. With each voice user identified, the data rate to be supported by each voice user for each carrier is determined (step 506). The supported data rate(s) also affect how the voice user transmissions are assigned to the carriers and how the voice user transmissions are assigned within the superframe of the carrier, e.g., user terminals having the same data rate may share packets of a common carrier. Thus, if two users share packets of a carrier, a data rate is chosen that is supported by the sharing user terminals. Frame assignments for the voice users are then made for the serviced carriers with voice users being multiplexed to share frames when possible (step 508).

After the assignment of frames for the carriers to voice users, allocations to data users are made. As a first step in making this allocation, the data users are identified (step 510). Then, based upon the service level requirements for each of the data users, e.g., QOS, IP SQL, etc., a determination is made as to which data users will be allocated frames in the current superframes of the carriers. As was described with reference to FIG. 1A, each carrier is shared by a plurality of user terminals 106–116, some of which require data communications support. Of these user terminals 106–116, a determination is made as to which, or all, of the user terminals 106–116 will be allocated frames in the superframes being constructed.

Once the data users have been identified and their service requirements have been determined, the remaining frames of the carriers that were not used for the voice users are allocated to the data users (step 512). As was previously discussed, each user terminal may support differing data rates for the differing carriers. The available frames of the carriers are then assigned to these data users based upon their respective data rates and the respective allocations (step 516). As was described, voice users and/or data users supporting the same data rates may share packets.

With the assignments of the voice users and the variable data rate users made, the superframes of the carriers are populated with voice and data according to the assignments of steps 508 and 516 (step 518). Then, the superframe is transmitted on the carriers to the users (step 520). The steps of FIG. 5 are repeated for each subsequent time period corresponding to subsequent superframes.

Figure 6:
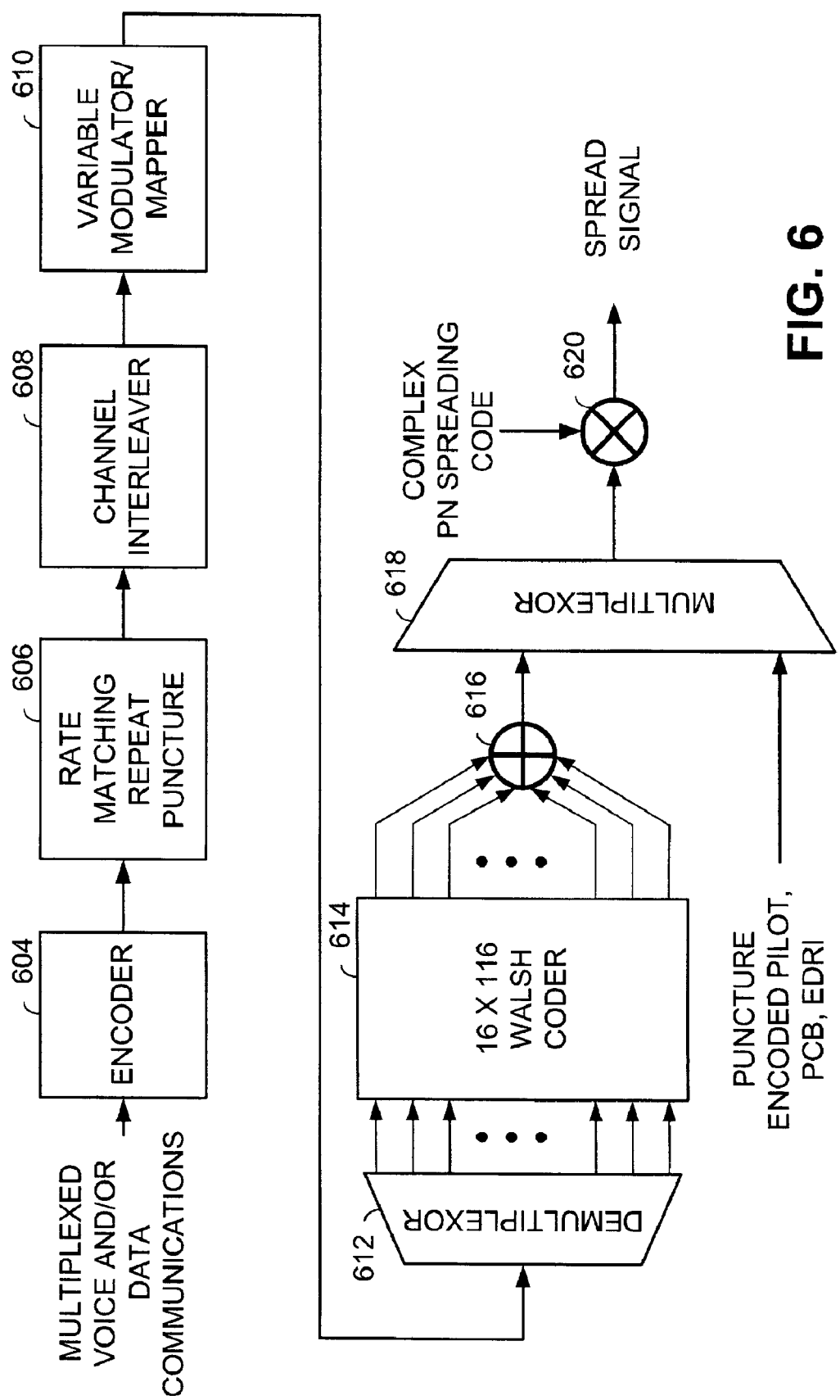
FIG. 6 is a block diagram showing an example of an apparatus for generating and processing the superframe structure of the invention for a single carrier.

FIG. 6 is a block diagram showing an example of an apparatus for generating and processing the superframe structure of the invention for a single carrier/F-CH. The components illustrated in FIG. 6 would be included within a base station that constructs the superframe. While the elements of FIG. 6 are shown as conventional circuit elements, some or all of the functions of these elements may be performed via software instructions by one or more digital processing devices, e.g., digital signal processor, micro processor, etc.

Multiplexed voice communications and/or the data communications are received by an encoder 604. As was described previously, a superframe includes voice and/or data communications intended for a plurality of user terminals serviced by a F-CH. Thus, all of these voice and/or data communications pass through the encoder 604 and are multiplexed such that they are inserted into a packet in the proper positions. The order in which the multiplexed voice and/or data communications enter the encoder 604 depends upon the assigned positions of the voice and/or data communications within the packet under construction. Operations performed in determining the structure of the superframe were described in detail with reference to FIG. 5.

The encoder 604 encodes the bit stream that it receives. In one embodiment, the encoder 604 encodes all received voice and data communications using turbo-coding operations. However, other embodiments, other coding technique(s) are employed. A rate-matching operator 606 receives the encoded bit stream from the encoder 604 and performs repeating and/or puncturing operations to cause its output to be rate matched.

A channel interleaver 608 receives the output of the rate-matching operator 606 and interleaves the received input. The channel interleaver 608 produces an interleaved output of its received input and provides the output to a variable modulator/mapper 610. Depending upon the data rate of the particular frame of the superframe that is being produced, the variable modulator/mapper 610 codes the bit stream according to a particular coding technique.

A demultiplexor 612 receives the encoded output of the variable modulator/mapper 610 and demulitiplexes the encoded output to produce 16 outputs. These 16 outputs are then coded with a 16×16 set of Walsh codes using Walsh coder 614. Because a F-CH that carries the superframe is TDM, at any time, the voice communication, or data communication carried by the F-CH is intended for only one user terminal. The user terminal then decodes one or more received communications using all 16 of the Walsh codes. Such decoding using all 16 Walsh codes produces a significantly improved decoded result as compared to coding using a single Walsh code or subset of the 16 Walsh codes. However, as was also previously described, in another embodiment, subsets of Walsh codes could be used to distinguish users on the F-CH.

The output of the Walsh coder 614 is then summed at summing node 616 and multiplexed with the encoded pilot signal, EDRI, and PCBs at multiplexor 618. The pilot signal, EDRI, and PCB, as has been previously described with reference to FIG. 4, are separately constructed and encoded. In the described embodiment, the pilot signal, EDRI, and the PCB are punctured into the bit stream produced at summing node 616. Thus, some of the voice/data bits are lost. However, because of the robust nature of the encoding performed by the encoder 604. This puncturing results in little or no degradation of performance. However, in another embodiment, the pilot signal, EDRI, and the PCB could be TDM multiplexed with the voice/data stream so that no voice/data is lost due to puncturing. The output of the multiplexor 618 is then modulated with a complex PN spreading code at modulator 620 to spread the energy of the communication across the allocated spectrum. The output of the modulator 620 is then transmitted on a corresponding F-CH at a designated carrier frequency.

Figure 7:
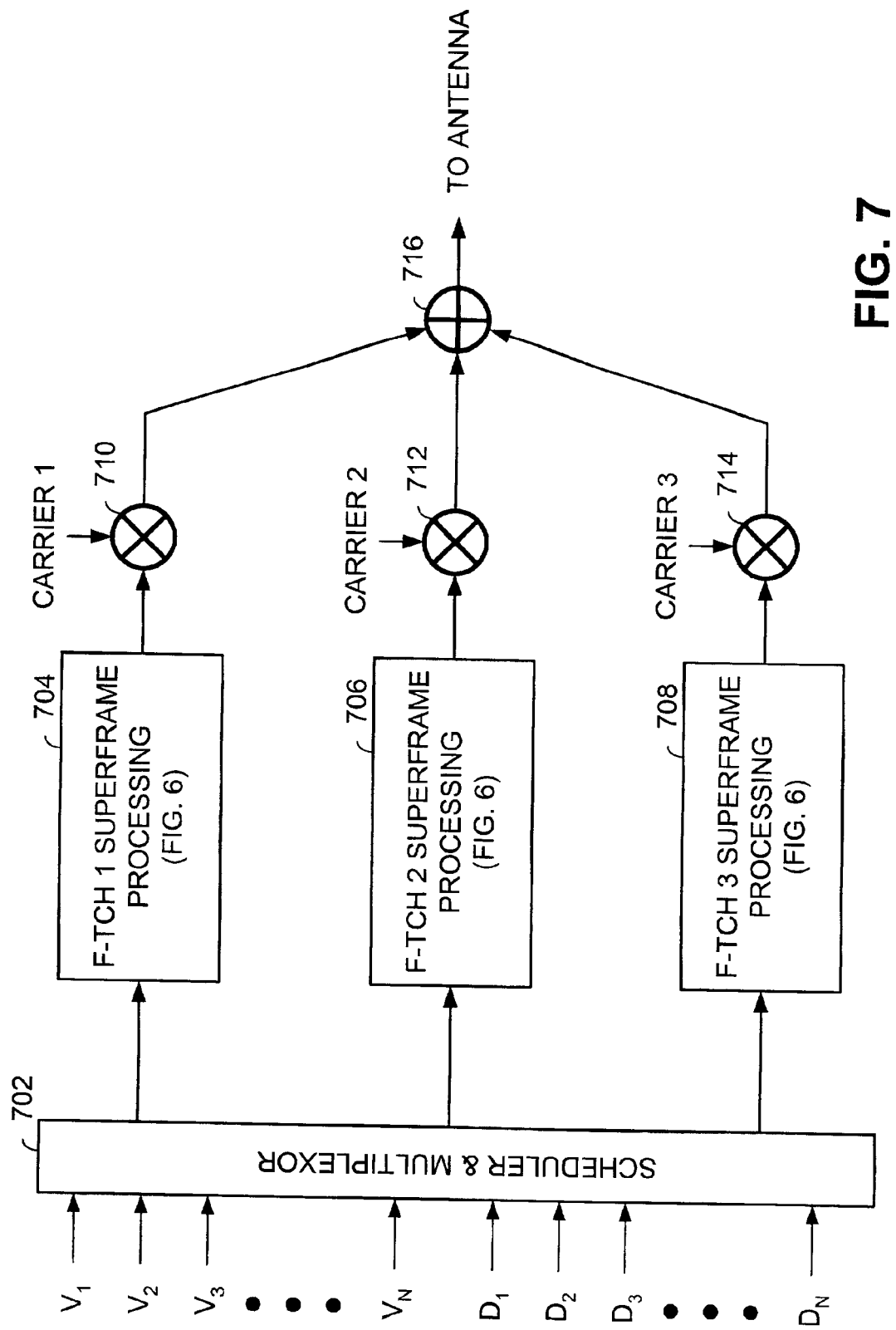
FIG. 7 is a block diagram showing an example of an apparatus for generating three superframe structures according to the present invention, each of which is carried upon a separate carrier and transmitted during a common time interval.

FIG. 7 is a block diagram showing an example of an apparatus for generating three superframe structures according to the present invention, each of which is carried upon a separate carrier and transmitted during a common time interval. All voice and data communications are received by a scheduler/multiplexor 702. Based upon operations previously described, the scheduler/multiplexor 702 time division multiplexes the voice and data communications such that they are placed within a plurality of TDM superframes/frames. In the embodiment of FIG. 7, three TDM superframes are constructed, each of which will be transmitted on a corresponding F-CH at a corresponding carrier frequency.

The scheduler/multiplexor 702 provides input to superframe processing elements for each of the three F-CHs, 704, 706, and 708, respectively. Each of these superframe processing elements 704, 706, and 708 includes the structure previously described. The outputs of these superframe processing elements 704, 706, and 708 are provided to modulators 710, 712, and 714, that modulate the outputs with Carrier 1, Carrier 2, and Carrier 3, respectively. The outputs of the modulators 710, 712, and 714, which form the three F-CHs, are then summed at summing node 716 and transmitted by an antenna to the serviced user terminals.

Figure 8:
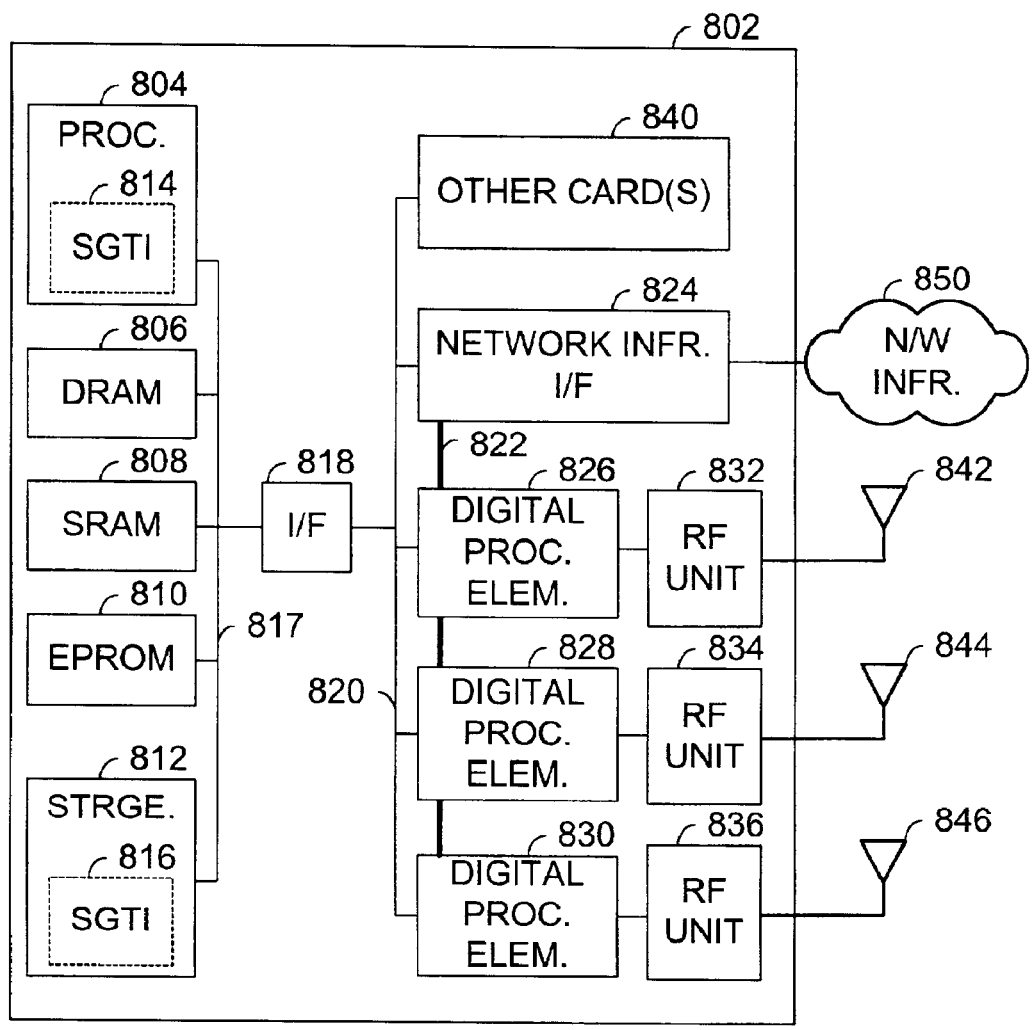
FIG. 8 is a block diagram illustrating a base station constructed according to the present invention.

FIG. 8 is a block diagram illustrating a base station 802 constructed according to the present invention that performs the operations previously described herein. The base station 802 supports a CDMA operating protocol, e.g., IS-95A, IS-95B, IS-2000, and/or various 3G and 4G standards, that is, or has been modified to be compatible with the teachings of the present invention. However, in other embodiments, the base station 802 supports other operating standards.

Figure 9:
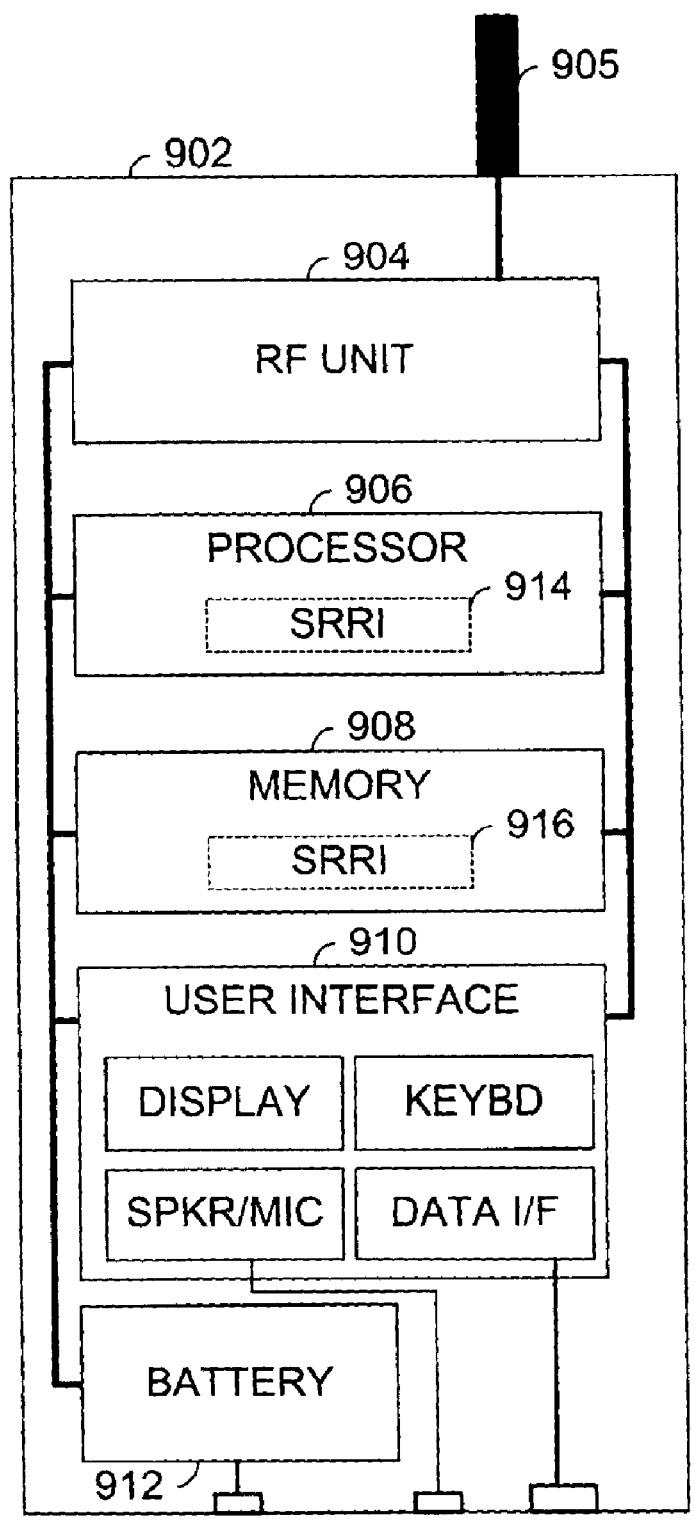
FIG. 9 is a block diagram illustrating a user terminal constructed according to the present invention.

The base station 802 includes a processor 804, dynamic RAM 806, static RAM 808, Flash memory, EPROM 810 and at least one data storage device 812, such as a hard drive, optical drive, tape drive, etc. These components (which may be contained on a peripheral processing card or module) intercouple via a local bus 817 and couple to a peripheral bus 820 (which may be a back plane) via an interface 818. Various peripheral cards couple to the peripheral bus 820. These peripheral cards include a network infrastructure interface card 824, which couples the base station 802 to the wireless network infrastructure 850. Digital processing cards 826, 828, and 830 couple to Radio Frequency (RF) units 832, 834, and 836, respectively. Each of these digital processing cards 826, 828, and 830 performs digital processing for a respective sector, e.g., sector 1, sector 2, or sector 3, serviced by the base station 802. Thus, each of the digital processing cards 826, 828, and 830 will perform some or all of processing operations described with reference to FIGS. 6 and 7. The RF units 832, 834, and 836 couple to antennas 842, 844, and 846, respectively, and support wireless communication between the base station 802 and user terminals (the structure of which is shown in FIG. 9). The base station 802 may include other cards 840 as well.

Superframe Generation and Transmission Instructions (SGTI) 816 are stored in storage 812. The SGTI 816 are downloaded to the processor 804 and/or the DRAM 806 as SGTI 814 for execution by the processor 804. While the SGTI 816 are shown to reside within storage 812 contained in base station 802, the SGTI 816 may be loaded onto portable media such as magnetic media, optical media, or electronic media. Further, the SGTI 816 may be electronically transmitted from one computer to another across a data communication path. These embodiments of the SGTI are all within the spirit and scope of the present invention. Upon execution of the SGTI 814, the base station 802 performs operations according to the present invention previously described herein in generating and transmitting superframes. The SGTI 816 may also be partially executed by the digital processing cards 826, 828, and 830 and/or other components of the base station 802. Further, the structure of the base station 802 illustrated is only one of many varied base station structures that could be operated according to the teachings of the present invention.

FIG. 9 is a block diagram illustrating a user terminal 902 constructed according to the present invention that performs the operations previously described herein. The user terminal 902 supports a CDMA operating protocol, e.g., IS-95A, IS-95B, IS-2000, and/or various 3G and 4G standards that is, or has been modified to be compatible with the teachings of the present invention. However, in other embodiments, the user terminal 902 supports other operating standards.

The user terminal 902 includes an RF unit 904, a processor 906, and a memory 908. The RF unit 904 couples to an antenna 905 that may be located internal or external to the case of the user terminal 902. The processor 906 may be an Application Specific Integrated Circuit (ASIC) or another type of processor that is capable of operating the user terminal 902 according to the present invention. The memory 908 includes both static and dynamic components, e.g., DRAM, SRAM, ROM, EEPROM, etc. In some embodiments, the memory 908 may be partially or fully contained upon an ASIC that also includes the processor 906. A user interface 910 includes a display, a keyboard, a speaker, a microphone, and a data interface, and may include other user interface components. The RF unit 904, the processor 906, the memory 908, and the user interface 910 couple via one or more communication buses/links. A battery 912 also couples to and powers the RF unit 904, the processor 906, the memory 908, and the user interface 910.

Superframe Receipt and Response Instructions (SRRI) 916 are stored in memory 908. The SRRI 916 are downloaded to the processor 906 as SRRI 914 for execution by the processor 906. The SRRI 916 may also be partially executed by the RF unit 904 in some embodiments. The SRRI 916 may be programmed into the user terminal 902 at the time of manufacture, during a service provisioning operation, such as an over-the-air service provisioning operation, or during a parameter updating operation. The structure of the user terminal 902 illustrated is only an example of one user terminal structure. Many other varied user terminal structures could be operated according to the teachings of the present invention.

Upon execution of the SRRI 914, the user terminal 902 performs operations according to the present invention previously described herein in receiving packets/superframes according to the present invention on the plurality of F-CHs. These operations include decoding portions of the packets/superframes intended for the user terminal 902 and responding to a servicing base station, e.g., base station 902, to indicate channel qualities. Operations performed by the user terminal 902 in receiving the packets/superframes and extracting intended communications are performed inversely to the techniques described with reference to FIGS. 6 and 7. Additional required operations of receiving and interpreting the preamble and/or primary EDRI and the secondary EDRI are evident based upon the teachings provided herein. Further, other of these operations are executed to report channel quality indications or maximum supportable data rate indications to a base station 902 that services a corresponding reverse link.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims.

What is claimed is:

1. A method of operating a base station to transmit communications to a plurality of user terminals on a plurality of carriers, the method comprising:

for each of the plurality of carriers, receiving channel quality indications from the plurality of user terminals;

based upon the channel quality indications received from the plurality of user terminals, for each of the plurality of carriers, determining a maximum data rate supportable for each of the user terminals;

based upon the maximum data rate supportable for each of the user terminals for each of the plurality of carriers, and a minimum quality of service required for each user terminal, allocating frames in a plurality of superframes corresponding to the plurality of carriers a subsequent communication to the plurality of user terminals;

transmitting the subsequent communication to the plurality of user terminals based upon the allocation of frames; and wherein the plurality of superframes are transmitted on the plurality of carriers and are synchronized in time.

2. The method of claim 1, further comprising allocating the plurality of frames to the plurality of user terminals in order to maximize throughput based upon the constraints of service criteria.

3. The method of claim 2, wherein the service criteria are based upon user terminal subscription levels.

4. The method of claim 2, wherein the service criteria is based upon fairness in resource allocation.

5. The method of claim 1, wherein the subsequent communication includes both voice communications and data communications.

6. The method of claim 1, wherein the base station transmits voice communications and the data communications on separate carriers.

7. The method of claim 5, wherein successive packets of a data communication are carried on separate carriers.

8. The method of claim 5, wherein successive packets of a voice communication are carried on separate carriers.

9. The method of claim 1, wherein:

each superframe includes a plurality of frames that is transmitted on one carrier of the plurality of carriers; and a frame of the plurality of frames includes a preamble that indicates the contents of the frame.

10. The method of claim 1, wherein the base station transmits superframes at a frequency that meets a voice communication rate requirement.

11. The method of claim 1, further comprising coding at least one superframe with a plurality of Walsh codes prior to its transmission.

12. The method of claim 1, wherein at least one superframes support both voice communications and data communications.

13. The method of claim 1, wherein each superframe includes a plurality of frames and each frame includes:

a pilot signal; and a plurality of reverse link power control bits intended for the plurality of user terminals.

14. The method of claim 9, wherein the preamble further indicates that the frame carries a voice communication.

15. The method of claim 9, wherein the preamble further indicates that the frame carries a data communication.

16. The method of claim 9, wherein:

the preamble includes a user identifier field; and the user identifier field identifies one or more user terminals for which the frame is intended.

17. The method of claim 9, wherein:

the preamble includes an explicit data rate indicator and an identifier, the explicit data rate indicator indicates a data rate of the frame; and the identifier identifies one or more user terminals for which the frame is intended.

18. The method of claim 1, further comprising assigning communications for a particular user terminal on a carrier having a best channel quality indication.

19. The method of claim 1, wherein a superframe of the plurality of superframes supports both voice communications and data communications, and the method further comprises:

encoding the data communications of the superframe using a first coding algorithm; and encoding the voice communications of the superframe using a second coding algorithm that is different from the first coding algorithm.

20. The method of claim 1, wherein the plurality of superframes are time-aligned when transmitted on the plurality of carriers.

21. A method of operating a user terminal within a wireless communication system to receive communications on a plurality of carriers, the method comprising:

receiving a plurality of pilot signals, wherein each pilot signal corresponds to a carrier of the plurality of carriers;

determining a plurality of channel quality indications, wherein each channel quality indication corresponds to one of the plurality of carriers;

reporting the plurality of channel quality indications to a serving base station; and receiving a communication in a superframe on on a corresponding carrier of the plurality carriers that satisfies a minimum quality of service required for the user terminal, wherein receiving the communication includes decoding the superframe with a plurality of Walsh codes.

22. The method of claim 21, wherein the communication includes both a voice communication and a data communication.

23. The method of claim 22, further comprising:

receiving a voice communication in a frame of a superframe on a first carrier of the plurality of carriers; and receiving a data communication in a flame of a superframe on a second carrier of the plurality of carriers.

24. The method of claim 22, wherein the voice communication and the data communication are received on a common carrier.

25. The method of claim 21, wherein the plurality of superframes carried by the plurality of carriers arrive synchronized in time.

26. The method of claim 21, wherein:

the communication is received in a a frame of a superframe that includes a plurality of frames and that is transmitted on one carrier of the plurality of carriers; and the frame includes a preamble that indicates the contents of the packet.

27. The method of claim 26, wherein:

data communications received in the superframe are encoded using a first coding algorithm; and voice communications received in the superframe are encoded using a second coding algorithm that is different from the first coding algorithm.

28. The method of claim 21, further comprising receiving communications on a carrier having a best channel quality.

29. A base station that transmits communications to a plurality of user terminals on a plurality of carriers, the base station comprising:

an antenna;

a Radio Frequency unit coupled to the antenna; and at least one digital processor coupled to the Radio Frequency unit that executes software instructions causing the base station to:

for each of the plurality of carriers, receive channel quality indications from the plurality of user terminals;

based upon the channel quality indications received from the plurality of user terminals, for each of the plurality of carriers, determine a maximum data rate supportable for each of the user terminals;

based upon the maximum data rate supportable for each of the user terminals for each of the plurality of carriers, and a minimum quality of service required for each user terminal, allocate frames in a plurality of superframes corresponding to the plurality of carriers in a subsequent communication to the plurality of user terminals;

transmit the subsequent communication to the plurality of user terminals based upon the allocation of frames; and wherein the plurality of superframes are transmitted on the plurality of carriers and are synchronized in time.

30. A user terminal that operates to wirelessly receive communications on a plurality of carriers, the user terminal comprising:

an antenna;

a Radio Frequency unit coupled to the antenna; and a digital processor coupled to the Radio Frequency unit that executes software instructions causing the user terminal to:

receive a plurality of pilot signals, wherein each pilot signal corresponds to a carrier of the plurality of carriers;

determine a plurality of channel quality indications, wherein each channel quality indication corresponds to one of the plurality of carriers;

report the plurality of channel quality indications to a serving base station; and receive a communication in a superframe on a corresponding carrier of the plurality of carriers that satisfies a minimum quality of service required for the user terminal, wherein receiving the communication includes decoding the superframe with a plurality of Walsh codes.

31. A plurality of software instructions stored on a media that, upon execution by a base station, cause the base station to transmit communications to a plurality of user terminals on a plurality of carriers, the plurality of software instructions comprising:

a set of instructions executed by the base station that cause the base station to, for each of the plurality of carriers, receive channel quality indications from the plurality of user terminals;

a set of instructions executed by the base station that cause the base station to, based upon the channel quality indications received from the plurality of user terminals, for each of the plurality of carriers, determine a maximum data rate supportable for each of the user terminals;

a set of instructions executed by the base station that cause the base station to, based upon the maximum data rate supportable for each of the user terminals for each of the plurality of carriers, and a minimum quality of service required for each user terminal, allocate frames in a plurality of superframes corresponding to the plurality of carriers in a subsequent communication to the plurality of user terminals; and a set of instructions executed by the base station that cause the base station to transmit the subsequent communication to the plurality of user terminals based upon the allocation of frames such that the plurality of superframes are transmitted on the plurality of carriers and are synchronized in time.

32. A plurality of software instructions stored on a media that, upon execution by a user terminal, cause the user terminal to wirelessly receive communications on a plurality of carriers, the plurality of software instructions comprising:

a set of instructions executed by the user terminal that cause the user terminal to receive a plurality of pilot signals, wherein each pilot signal corresponds to a carrier of the plurality of carriers;

a set of instructions executed by the user terminal that cause the user terminal to determine a plurality of channel quality indications, wherein each channel quality indication corresponds to one of the plurality of carriers;

a set of instructions executed by the user terminal that cause the user terminal to report the plurality of channel quality indications to a serving base station; and a set of instructions executed by the user terminal that cause the user terminal to receive a communication in a superframe on on a corresponding carrier of the plurality of carriers that satisfies a minimum quality of service required for the user terminal, wherein receiving the communication includes decoding the superframe with a plurality of Walsh codes.

* * * * *